(12) United States Patent
Wei

(10) Patent No.: US 11,556,467 B1
(45) Date of Patent: Jan. 17, 2023

(54) OPTIMIZING GARBAGE COLLECTION THAT USES A LOGICAL-TO-PHYSICAL TABLE SEARCH

(71) Applicant: Micron Technology, inc., Boise, ID (US)

(72) Inventor: Meng Wei, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/396,310

(22) Filed: Aug. 6, 2021

(30) Foreign Application Priority Data

Jul. 13, 2021 (WO) ................ PCT/CN2021/105996

(51) Int. Cl.
*G06F 12/02* (2006.01)
*G06F 12/0882* (2016.01)
*G06F 3/06* (2006.01)

(52) U.S. Cl.
CPC .......... *G06F 12/0253* (2013.01); *G06F 3/064* (2013.01); *G06F 3/0619* (2013.01); *G06F 3/0679* (2013.01); *G06F 12/0246* (2013.01); *G06F 12/0882* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2010/0174851 A1* | 7/2010 | Leibowitz | G06F 13/1684 |
| | | | 711/E12.001 |
| 2017/0132069 A1* | 5/2017 | Wang | G06F 11/073 |
| 2017/0139839 A1* | 5/2017 | Ke | G06F 12/1009 |
| 2018/0307558 A1* | 10/2018 | Chen | G06F 12/0246 |
| 2019/0087349 A1* | 3/2019 | Chung | G06F 3/0631 |

* cited by examiner

*Primary Examiner* — Kevin Verbrugge
(74) *Attorney, Agent, or Firm* — Nicholson De Vos Webster & Elliott LLP

(57) ABSTRACT

A method is described that includes determining, by a memory subsystem, that a garbage collection process is to be performed on a memory device and selecting a first candidate block stripe for folding into a first target block stripe in response to determining that the garbage collection process is to be performed. The method further includes determining, by the memory subsystem, that a physical-to-logical table stored in the first candidate block stripe is unavailable; reducing a write command rate, which controls a rate at which writes are fulfilled by the memory subsystem, in response to determining that the physical-to-logical table stored in the first candidate block stripe is unavailable; and performing folding of the first candidate block stripe into the first target block stripe using a logical-to-physical table.

20 Claims, 7 Drawing Sheets

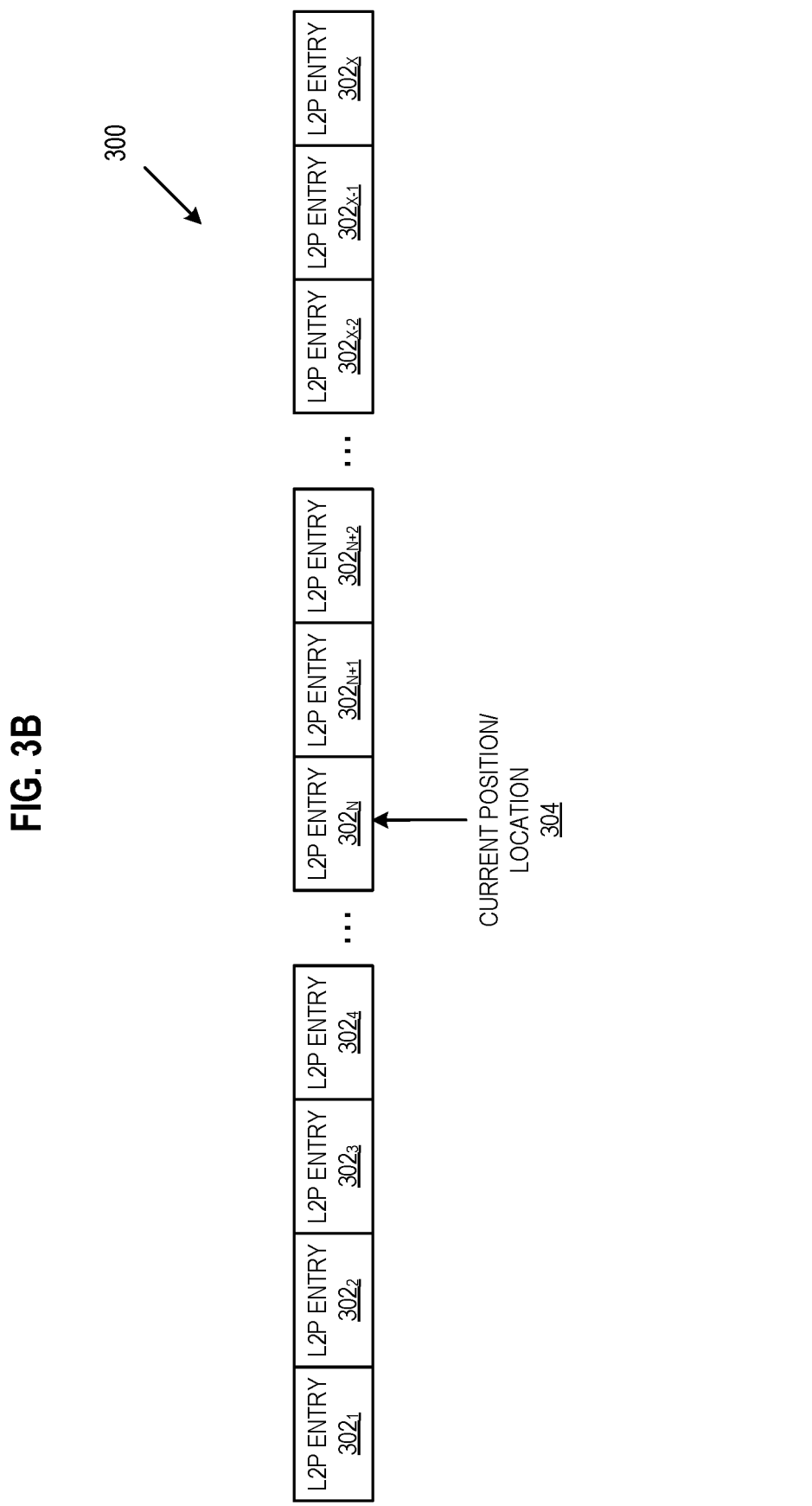

US 11,556,467 B1

OPTIMIZING GARBAGE COLLECTION THAT USES A LOGICAL-TO-PHYSICAL TABLE SEARCH

CROSS-REFERENCE TO RELATED APPLICATION

The present application claims the benefit of International Application No. PCT/CN2021/105996 filed on Jul. 13, 2021, which is hereby incorporated by reference.

TECHNICAL FIELD

The present disclosure generally relates to garbage collection, and more specifically, relates to optimizing garbage collection that uses a logical-to-physical (L2P) table search.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3B shows the example L2P table and an updated location/position in the L2P search process, in accordance with some embodiments of the present disclosure.

DETAILED DESCRIPTION

Figure 1:
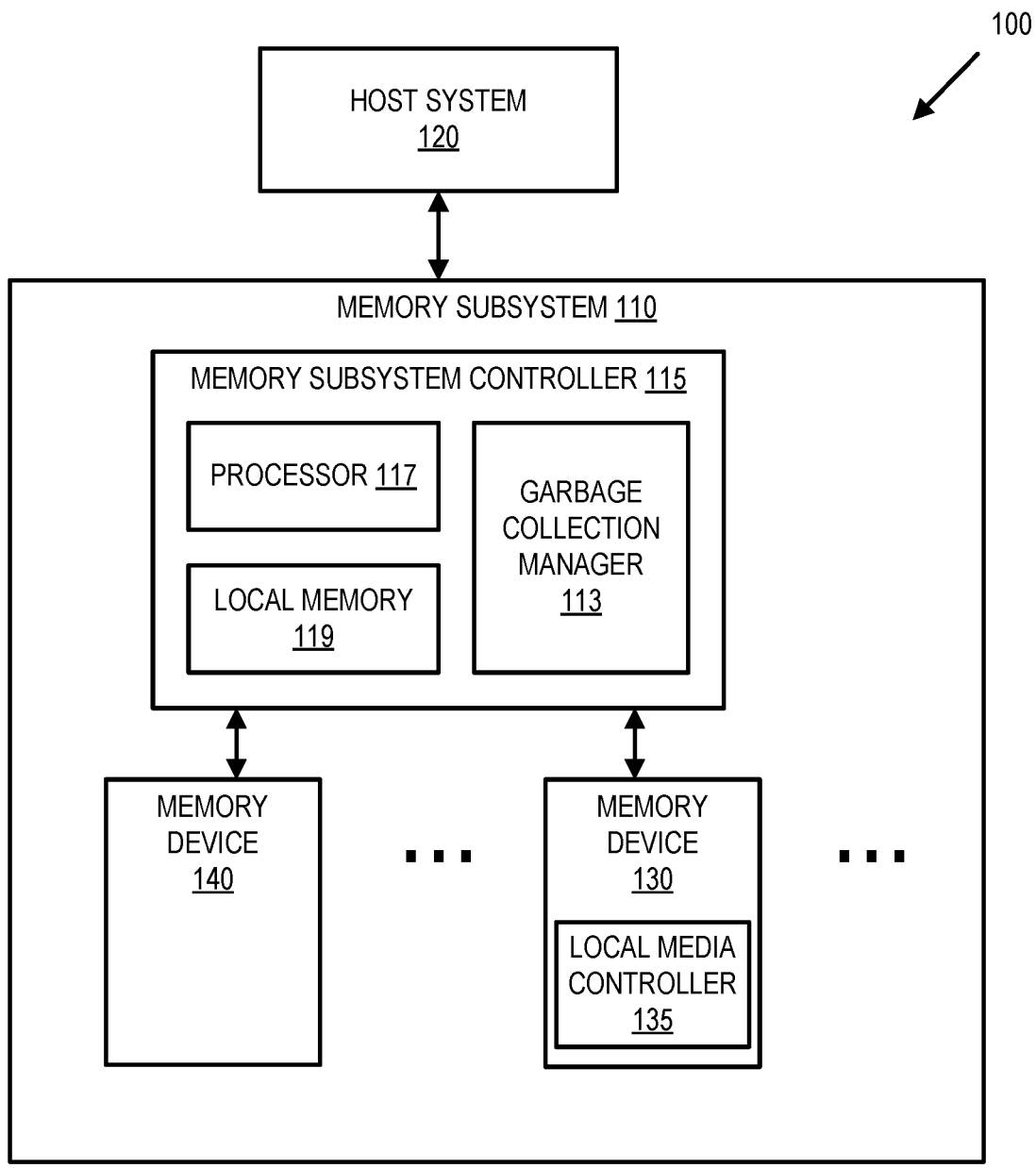
FIG. 1 illustrates an example computing system that includes a memory subsystem in accordance with some embodiments of the present disclosure.

Aspects of the present disclosure are directed to optimizing garbage collection that uses a logical-to-physical (L2P) table search in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

A memory subsystem can be composed of various layers/levels, including an operating system layer, a file system layer, a flash translation layer (FTL), and a NAND flash layer. The FTL is a software layer between the file system layer and the NAND flash layer that allows the operating system layer to read and write to the NAND flash layer in the same way as to a disk drive. In particular, the FTL provides virtual to physical address translation, wear leveling, and garbage collection for management of the NAND flash layer. Proper operation of the memory subsystem relies on these services. For example, each write or rewrite performed by the FTL in relation to the NAND flash layer requires a free translation unit. In particular, even if the FTL is seeking to rewrite data that is currently stored in a particular translation unit of the NAND flash layer, the FTL does not write/rewrite the data to this particular translation unit, but instead uses a free translation unit to store the data. This configuration requires free translation units to be readily available in the NAND flash layer. Garbage collection assists with making free translation units available in the NAND flash layer by identifying invalid translation units in a block/block stripe.

For example, a garbage collection procedure can use a valid page (VP) bitmap that logs/tracks valid translation units for each block stripe and is stored outside the corresponding block stripe (e.g., a die can include 500 block stripes and 485 of the block stripes are devoted to user data while the 15 remaining block stripes are devoted to VP bitmaps for the 485 user data block stripes). A garbage collection procedure goes through the VP bitmap to identify all the valid translation units in a corresponding block stripe and folds/copies these valid translation units into a target block stripe. Accordingly, the previous block stripe no longer has valid translation units and can be entirely erased and made available for a future program/write operation.

In another example, a garbage collection procedure can use a physical-to-logical (P2L) table that logs/tracks logical addresses for each translation unit of a corresponding block stripe and is stored within the corresponding block stripe. In particular, a garbage collection procedure goes through a P2L table to determine a logical address for each translation unit of the block stripe and uses the logical address to obtain the physical address from an L2P table. The retrieved physical address from the L2P table is compared with the original physical address used with the P2L table to determine a match. When a match is identified, the translation unit is known to be valid and will be folded/copied to another/target block stripe.

If a memory subsystem uses a P2L table for garbage collection and the memory subsystem also uses a multi-cursor strategy, which separates host data (e.g., user data from a host system), garbage collection data (e.g., user data that is being folded/copied into a target block stripe), and system data (e.g., an L2P table) in different block stripes, then there is a non-negligible probability of a deadlock condition. In particular, since a multi-cursor strategy separates host data, garbage collection data, and system data into different block stripes, there are potentially three block stripes being written/programmed at any given time, and each will require free translation units to perform these write/program operations. In this situation, the P2L table may not be able to be correctly read from the NAND flash layer (e.g., uncorrectable even using error correcting codes (ECCs) due to a physical issue with the NAND flash layer), which will prevent garbage collection from supplying more free translation units. This can happen because the P2L table (potentially along with metadata) is stored together with user data in a TLC block, which has considerably lower stability than an SLC block and can lead to data corruption.

To address P2L corruption, an L2P table-based search can be employed. Each entry in the L2P table includes or otherwise references a physical address, including one or more of a block number/identifier, a page number/identifier, a translation unit number/identifier, and a plane number/identifier. In an L2P table-based search, the block, page, and translation unit numbers of each entry in the L2P table are compared against the block, page, and translation unit numbers of translation units in a candidate block stripe to determine if a match exists. If the block, page, and translation unit numbers of an entry in the L2P table matches with the block, page, and translation unit numbers of a translation unit of the candidate block stripe, this identifies a valid translation unit within the block stripe, which should be folded/copied to a target block stripe before the candidate block stripe can be erased. Although this technique can accurately identify valid and invalid translation units within a candidate block stripe, this process is resource-intensive (e.g., time and processing power), as the L2P table must be repeatedly parsed with corresponding address/number comparisons. In particular, for a 2 gigabyte (GB) drive, the L2P table-based search can take over 512 seconds to complete the folding of a single block stripe. In comparison, garbage collection using a P2L table (when the P2L table is not corrupted) for a 2 GB drive would take approximately 5 seconds to complete the folding of a single block stripe. This extreme delay with use of an L2P table-based search can result in command timeout (i.e., a host command is not fulfilled during a timeout period), a blue or black screen event, or another fatal error.

Aspects of the present disclosure address the above and other deficiencies by performing one or more of: (1) limiting a write speed to TLC block stripes, including potentially aborting write requests when the number of free block stripes is below a threshold such that free space will not be consumed too quickly while waiting for more space to be freed using garbage collection; (2) modifying a garbage collection policy to potentially free up space more quickly, such that the write speed can be increased; and (3) periodically recording the current place/entry in an L2P table while performing an L2P table-based search for a particular block stripe, such that the L2P table-based search for this block stripe can be intermittently paused and later resumed to split the heavy L2P table-based search cost over time, while performing a more resource efficient P2L-based garbage collection using other block stripes. Accordingly, the above adjustments to a memory subsystem allow for an L2P table-based search to be used in garbage collection for block stripes when a P2L table is corrupted for these block stripes, while avoiding potential error conditions.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a garbage collection manager 113 that can adjust one or more parameters of the memory subsystem 110 to optimize garbage collection that uses a logical-to-physical (L2P) table search. In some embodiments, the controller 115 includes at least a portion of the garbage collection manager 113. For example, the controller 115 can include a processor 117 (processing device) configured to execute instructions stored in local memory 119 for performing the operations described herein. In some embodiments, a garbage collection manager 113 is part of the host system 110, an application, or an operating system. Further details with regards to the operations of the garbage collection manager 113 are described below.

Figure 2:
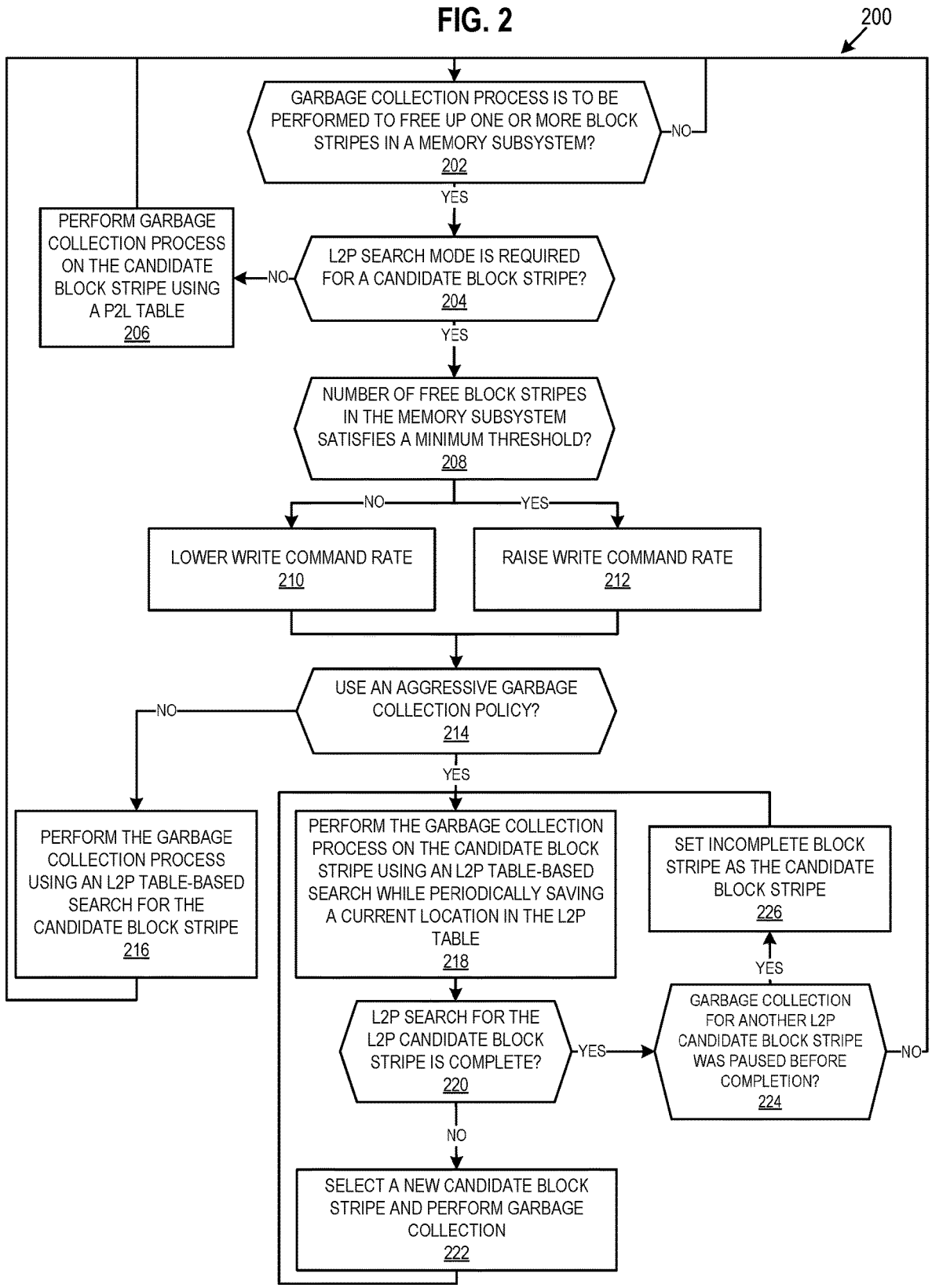
FIG. 2 is a flow diagram of an example method to perform an optimized garbage collection process using either a logical-to-physical (L2P) table and/or a physical-to-logical (P2L) table, in accordance with some embodiments of the present disclosure.

FIG. 2 is a flow diagram of an example method 200 to perform an optimized garbage collection process using either an L2P table and/or a P2L table, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the garbage collection manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, the method 200 commences at operation 202 with the processing device determining whether a garbage collection process is to be performed in the memory subsystem 110 to free up one or more block stripes in the memory subsystem 110. As noted above, the memory subsystem 110 can only perform writing/programming operations on free block stripes (e.g., block stripes that are erased and do not store data). Accordingly, the memory subsystem 110 should ensure free block stripes are readily available to accommodate program operations (e.g., program operations corresponding to write requests from the host system 120 or program operations corresponding to internally generated write requests). In one embodiment, the processing device determines whether a garbage collection process is to be performed based on a number of free block stripes (e.g., block stripes that do not have any translation units being used to store data) in the memory subsystem 110. For example, the processing device can compare the number of free block stripes in the memory devices 130/140 to a garbage collection threshold. The garbage collection threshold can be a static value (e.g., fifteen block stripes or five percent of the total number of block stripes in the memory devices 130/140) or can be dynamically adjusted. When the processing device determines that the number of free block stripes in the memory subsystem 110 satisfies the garbage collection threshold (e.g., the number of free block stripes in the memory subsystem 110 is greater than or equal to the garbage collection threshold), the processing device determines that the garbage collection process does not need to be performed as there are sufficient free block stripes to meet write request requirements. In this situation, the method 200 remains at operation 202 to continually determine whether a garbage collection process is to be performed. When the processing device determines that the number of free block stripes in the memory subsystem 110 does not satisfy the garbage collection threshold (e.g., the number of free block stripes in the memory subsystem 110 is less than the garbage collection threshold), the processing device determines that the garbage collection process is to be performed and the method 200 moves to operation 204. As noted above, garbage collection processes locate a candidate block stripe to be freed/erased and examine the candidate block stripe for folding/copying valid translation units to a target block stripe. The candidate block stripe can be selected based on a garbage collection policy. For example, a garbage collection policy can cause the processing device to select a candidate block stripe partially or entirely based on a valid translation unit count (VTC), which indicates how many valid translation units are present in the block stripe. In this example, the processing device selects a block stripe as the candidate block stripe that has a highest VTC or a VTC that satisfies a threshold. As will be described below, the processing device can use other garbage collection policies.

At operation 204, the processing device determines if an L2P table-based search (sometimes referred to as an L2P search mode) is required for performing garbage collection on the candidate block stripe. In particular, the memory subsystem 110 can ideally utilize a P2L table for determining valid translation units in the candidate block stripe such that folding/copying can be performed. However, the P2L table may be corrupted while being stored in the candidate block stripe (e.g., stored along with user data in a TLC block of the memory devices 130/140). Upon determining that the P2L table for the candidate block stripe is corrupt and cannot be used, the processing device determines that an L2P search mode is required for performing the garbage collection process in relation to the candidate block stripe. Accordingly, the L2P table-based search, which utilizes an L2P table that is shared across all block stripes of the memory devices 130/140, is a backup search procedure when a P2L table-based search is not available for the candidate block stripe. In some cases, the P2L table is stored along with error-correcting code (ECC), such that a defined number of bit errors can be corrected in the P2L table while stored in the memory devices 130/140. Once the number of bit errors for the P2L table exceed the correction ability of the ECC, the processing device can determine the P2L table is unavailable/corrupt such that an L2P table-based search is needed. In response to determining that an L2P table-based search is not required for performing the garbage collection process on the candidate block stripe (e.g., the P2L table for the candidate block stripe is not corrupt and can be properly read), the method 200 moves to operation 206.

At operation 206, the processing device performs the garbage collection on the candidate block stripe using a P2L table of the candidate block stripe. In particular, for each translation unit in the candidate block stripe, the processing device uses the physical address of the translation unit to locate a logical address using the P2L table. The processing device thereafter uses the determined logical address to locate a physical address using an L2P table. If the physical address determined using the L2P table matches the physical address of the translation unit, the processing device determines that data in the translation unit is valid and is folded into another/target block stripe before erasing/freeing the candidate block stripe. Otherwise, if the physical address determined using the L2P table does not match the physical address of the translation unit, the processing device determines that data in the translation unit is invalid and is not be folded into another/target block stripe. Accordingly, during the garbage collection process, the processing device identifies all valid translation units in a candidate block stripe and folds/copies these valid translation units into a target block stripe. Consequently, the processing device can now erase the entire candidate block stripe, as all data of valid translation units has been moved/copied to the target block stripe. This erased candidate block stripe is now free to be used for a subsequent write/rewrite operation. Following completion of folding the candidate block stripe using the P2L table-based search, the method 200 returns to operation 202 to determine whether the garbage collection process is still needed. If garbage collection is to continue to be performed, a new candidate block stripe is selected according to the garbage collection policy.

Although described above as a P2L table-based search and an L2P table-based search, the P2L table-based search still relies on use of an L2P table. Accordingly, the P2L table-based search is a page validity search that relies on a P2L table along with other tables (e.g., an L2P table), while an L2P table-based search is a page validity search that relies on an L2P table but does not involve or otherwise rely on any other mapping or validity tables, including a P2L table or a VP bitmap.

Returning to operation 204, in response to determining that an L2P table-based search is required for performing the garbage collection process on the candidate block stripe (e.g., the P2L table for the candidate block stripe is corrupt/unavailable and cannot be properly read), the method 200 moves to operation 208. At operation 208, the processing device determines if the number of free block stripes in the memory subsystem 110 satisfies a minimum threshold. The minimum threshold is lower than the garbage collection threshold described above in relation to operation 202. In particular, the garbage collection threshold indicates when the number of free block stripes is low enough to warrant the garbage collection process to be performed and the minimum threshold indicates when the number of free block stripes is low enough that other potentially remediating actions should be performed in addition to garbage collection, as will be described in greater detail below. In response to determining that the number of free block stripes in the memory subsystem 110 does not satisfy the minimum threshold (e.g., the number of free block stripes in the memory subsystem 110 is less than the minimum threshold), the method 200 moves to operation 210.

At operation 210, the processing device lowers a write command rate in the memory subsystem 110. In particular, the memory subsystem 110 can be configured in conjunction with the host system 120 to detect a timeout when confirmation of completion of a host write request was not received by the host system 120 within a timeout period. For example, the timeout period can be eight seconds. In this configuration, the processing device can lower a write command rate by delaying completion/fulfillment of a host write request/command by a delay period, which is less than the timeout period. For example, the processing device can artificially delay fulfillment of a write request from the host system 120 for five seconds (i.e., the delay period is five seconds). This throttling of fulfillment of the write memory request allows for more time for additional block stripes to be freed to meet the minimum threshold via the garbage collection process. In some embodiments, host write requests/commands and internally generated write requests/commands are treated separately. For example, the processing device can throttle/delay host write requests by a host delay period and throttle/delay internally generated write requests by an internal delay period. In this example, the host delay period and the internal delay period are independently set (i.e., the host delay period and the internal delay period are potentially not equal). In one embodiment, the processing device can abort all internally generated write requests while still fulfilling host write requests (although potentially based on a host delay period). In some embodiments, the processing device aborts all write requests until the number of free block stripes in the memory subsystem 110 meets the minimum threshold (e.g., when there are no free block stripes in the memory subsystem 110, the processing device does not fulfill any write requests, regardless of their origin/association). Although the processing device can adjust processing of write requests, this adjustment does not alter processing of read requests and the memory subsystem 110 still fulfills read requests, as fulfillment of these requests is not affected by the number of free block stripes in the memory subsystem 110.

In some embodiments, in response to determining that the write command rate is already at a sufficiently low level (e.g., the delay period is nearly equal to or otherwise nearly corresponds to the timeout period based on a previous iteration of operation 210), the processing device can determine to not further lower the write command rate at operation 210. In particular, at operation 210 the processing device first determines the current delay period and compares it against the timeout period or another threshold to determine whether the write command rate needs to or otherwise can be further decreased.

Returning to operation 208, in response to determining that the number of free block stripes in the memory subsystem 110 satisfies the minimum threshold (e.g., the number of free block stripes in the memory subsystem 110 is greater than or equal to the minimum threshold), the method 200 moves to operation 212. At operation 212, the processing device raises the write command rate in the memory subsystem 110. In particular, the processing device can reduce the delay period while ensuring that the delay period is greater than or equal to zero. For example, when the memory subsystem 110 is new, the delay period is set to zero, since little or no data is written to the memory devices 130/140, such that there are ample free block stripes. However, as time progresses and block stripes are used for storing data, the processing device can lower the write command rate by increasing the delay period at operation 210. As the garbage collection process is continually performed, the processing device can determine that the delay period can be relaxed/reduced such that the write command rate can be increased. Accordingly, the processing device can raise the write command rate to potentially return the delay period and consequent write command rate to their original settings (e.g., a delay period of zero and a maximum write command rate). In some embodiments, the degree of increasing the delay period at operation 210 and/or decreasing the delay period at operation 212 can be relative to the number of free block stripes. As noted above, adjusting the delay period can be in relation to each of a host delay period, which corresponds to a fulfillment/processing delay for host write requests/commands, and an internal delay period, which corresponds to a fulfillment/processing delay for internally generated write requests/commands In some embodiments, in response to determining that the write command rate is already at a sufficiently high level (e.g., the delay period is zero), the processing device can determine to not further raise the write command rate at operation 210 by further decreasing the delay period. In particular, at operation 210 the processing device first determines the current delays period and compares it against a threshold to determine whether the write command rate needs to or otherwise can be further decreased.

Following either operation 210 or operation 212, the method 200 moves to operation 214. At operation 214, the processing device determines whether to use an aggressive garbage collection policy to govern operation of the garbage collection process. In particular, the garbage collection process selects a candidate block stripe for processing and folding into a target block stripe. When the P2L table of the candidate block stripe is corrupt, the processing device resorts to an L2P table-based search to identify valid translation units for folding. However, as noted above, purely L2P table-based searches for identifying valid translation units can be resource-intensive (e.g., consuming large amounts of processing resources and time). Conservative garbage collection policies can require that the processing device complete processing of the current candidate block stripe before a new candidate block stripe can be selected for processing. In contrast, aggressive garbage collection policies can allow the processing device to pause or entirely abandon/abort processing of a current candidate block stripe in favor of processing a new candidate block stripe when one or more of (1) an L2P table-based search is needed and (2) the number of free block stripes is below the minimum threshold. Accordingly, these factors can be used to determine whether to use the aggressive garbage collection policy. For example, using an aggressive garbage collection policy, when the current candidate block stripe requires use of an L2P table-based search and the number of free block stripes is below the minimum threshold, the processing device can temporarily pause processing of the current candidate block stripe in favor of processing a new candidate block stripe. In some cases, the processing device can use the same criteria and/or process for selecting a new candidate block stripe as that used to select the previous candidate block stripe with the corrupt P2L table. Since P2L corruption is not a probable event, selecting another candidate block stripe with a corrupt P2L table is unlikely. However, the processing device can select an aggressive garbage collection policy that considers additional factors in selecting a new candidate block stripe, including (1) a number of program and erase cycles for a block stripe, (2) a total read count for a block stripe, and (3) a youngest recently programmed block stripe. For example, a high number of program and erase cycles for a block stripe can indicate that the block stripe is old (i.e., has been written and read for a long time relative to other block stripes), which can indicate the block stripe can include or be susceptible to more errors than a block stripe with a lower number of program and erase cycles. With respect to a high total read count for a block stripe, this can indicate a high read disturbance for the block stripe, which can indicate the block stripe can include or be susceptible to more errors than a block stripe with a lower total read count for a block stripe. In some embodiments, the total read count for a block stripe is the number of read operations on the block stripe since a previous write operation, which can clear any disturbance effects. With respect to a youngest recently programmed block stripe, this can indicate a low slow charge loss impact than an older programmed block stripe, which indicate a lower number of errors. The garbage collection process can use these updated/additional factors to improve the chances of selecting a new candidate block stripe that does not require an L2P table-based search to perform folding. Accordingly, at operation 214, the processing device determines whether an aggressive garbage collection policy is warranted. When the processing device determines that, based on the need to perform an L2P table-based search on the current candidate blocks stripe and/or the number of free block stripes is below the minimum threshold, the processing device can determine to use an aggressive garbage collection policy and the method 200 moves to operation 218. Otherwise, the method 200 moves to operation 216.

At operation 216, the processing device performs the garbage collection process using an L2P table-based search on the candidate block stripe to fold the candidate block stripe into a target block stripe. In particular, each entry in the L2P table includes or otherwise references a physical address, including one or more of a block number/identifier, a page number/identifier, a translation unit number/identifier, and a plane number/identifier. In an L2P table-based search, the block, page, and translation unit numbers of each entry in the L2P table are compared against the block, page, and translation unit numbers of translation units in the candidate block stripe to determine if a match exists. If the block, page, and translation unit numbers of an entry in the L2P table matches with the block, page, and translation unit numbers of a translation unit of the candidate block stripe, this identifies a valid translation unit within the block stripe, which should be folded/copied before the block stripe can be erased. This process is continued until each translation unit is identified as either being valid or invalid, such that valid translation units can be folded/copied into a target block stripe. After folding the valid translation units of the candidate block stripe into a target block stripe, the processing device erases the candidate block stripe to free this block stripe for use in write/rewrite operations.

Figure 3A:
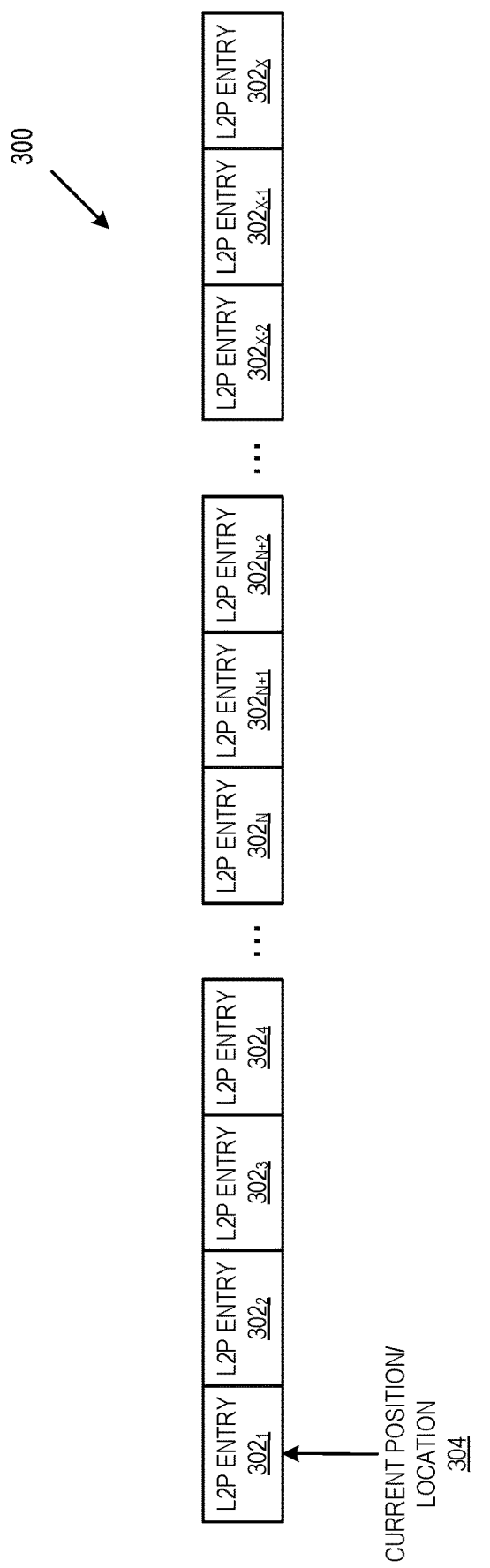
FIG. 3A shows an example L2P table, which includes a set of L2P entries, and a current location/position in an L2P search process, in accordance with some embodiments of the present disclosure.

As discussed above, when the processing device determines at operation 214 to use an aggressive garbage collection policy, the method 200 moves to operation 218. At operation 218, the processing device performs garbage collection on the candidate block stripe using an aggressive garbage collection policy. In particular, the aggressive garbage collection policy can allow the processing device to (1) pause or abandon performing an L2P table-based search on the current candidate block stripe, (2) select a new candidate block stripe for the garbage collection process, and/or (3) alter the methodology by which the new candidate block stripe is selected. Namely, as noted above, the L2P table-based search includes traversing each entry in the L2P table to determine a match with a translation unit in the candidate block stripe. However, since this L2P table-based search can take a long time to complete, the processing device can periodically save an identifier of a current entry in the L2P table (e.g., save a logical address of the current entry or save a time that has elapsed since beginning the L2P table-based search, which can be used to derive the current entry in the L2P table) such that the processing device can pause folding the current candidate block stripe into a target block stripe partially through the L2P table search and instead select a new candidate block stripe for folding. FIG. 3A shows an example L2P table 300, which includes a set of L2P entries $302_1$-$302_X$, and a current location/position 304 in the L2P table-based search process. Each of the L2P entries $302_1$-$302_X$ corresponds to a logical address (e.g., the L2P entry $302_1$ corresponds to the logical address 0000 0000, the L2P entry $302_2$ corresponds to the logical address 0000 0001, the L2P entry $302_2$ corresponds to the logical address 0000 0010, etc.), and includes or otherwise references a physical address, including one or more of a block number/identifier, a page number/identifier, a translation unit number/identifier, and a plane number/identifier. FIG. 3A shows the current location/position 304 in the L2P search process at the beginning of the L2P search process. In this situation, the current location/position 304 is the L2P entry $302_1$ in the L2P table 300, as the L2P table-based search iteratively moves through L2P entries 302 in the L2P table 300 and the L2P search process has just begun. FIG. 3B shows the L2P search process after the passage of some period of time. As shown in FIG. 3B, the current location/position 304 is now the L2P entry $302_N$ in the L2P table 300. In particular, the L2P table-based search has progressed during the period of time and the L2P table-based search is now examining the L2P entry $302_N$. The processing device can store the current location/position 304 according to different storage policies. For example, the processing device can store the current location/position 304 after each movement through an L2P entry 302 (i.e., the processing device saves (1) the logical address/index of each L2P entry 302 as they are being processed or has completed being processed or (2) an elapsed time corresponding to when a new L2P entry 302 is being processed or has completed being processed). In another example, the processing device can store the current location/position 304 at a prescribed interval (e.g., the processing device saves (1) the logical address/index of an L2P entry 302 after ten L2P entries 302 have completed being processed or (2) an elapsed time corresponding to when ten L2P entries 302 have completed being processed). In still another example, the processing device stores/records the current location/position 304 in response to determining to pause garbage collection for the current candidate block stripe and instead select a new candidate block stripe for performing garbage collection. In some embodiments, the processing device not only stores the location/position within the L2P table 300 but also the current location/position of the translation unit being processed by the L2P table-based search.

As noted above, the processing device can save the current L2P entry 302 in the L2P table 300 or the current elapsed time of the L2P table-based search. In either case, the processing device can accurately determine how many resources (e.g., time) are devoted to performing garbage collection on the current candidate block stripe. Further, both indicators (e.g., position and time) will allow the processing device to continue the L2P table-based search even during interrupting events that would lose progress of the L2P table-based search. These interrupting events include power cycles of the memory subsystem 110, which would otherwise result in the L2P table-based search from being entirely restarted from the beginning.

At operation 220, the processing device determines if the L2P table-based search on the candidate block stripe (sometimes known as the L2P candidate block stripe) is complete. In response to the processing device determining that the L2P table-based search on the candidate block stripe is complete, the method 200 moves to operation 224.

At operation 224, the processing device determines if garbage collection for an L2P candidate block stripe was paused and remains incomplete. In particular, if the processing device determines that there are no L2P candidate block stripes for which garbage collection was started but has not yet been completed, the method 200 moves to operation 202. Conversely, if an L2P table-based search was paused for a previous candidate block stripe and remains incomplete (e.g., the saved current location for the L2P table-based search is not the last entry in the L2P table), the method 200 moves to operation 226.

At operation 226, the processing device sets the paused/incomplete L2P candidate block stripe as the current candidate block stripe. In particular, the processing device selects the paused/incomplete L2P candidate block stripe as the current candidate block stripe such that garbage collection using an L2P table-based search can commence/resume. Following operation 226, the method 200 moves to operation 218 to resume garbage collection on the paused/incomplete L2P candidate block stripe. In this fashion, the method 200 continues to process L2P candidate block stripes until garbage collection using an L2P table-based search is completed while still allowing intervening P2L table-based searches of other block stripes.

Returning to operation 220, when the processing device determines that the L2P table-based search on the candidate block stripe is incomplete, the method 200 moves to operation 222. At operation 222, the processing device selects a new candidate block stripe and performs garbage collection on this new candidate block stripe. In particular, the processing device pauses processing of the L2P candidate block stripe and selects a new candidate block stripe using the aggressive garbage collection policy described above. In particular, the aggressive garbage collection policy allows the pausing and/or aborting of processing the L2P candidate block stripe, which requires an L2P table-based search, and optionally considers several factors in selecting a new candidate block stripe, including (1) a number of program and erase cycles for a block stripe, (2) a total read count for a block stripe, and (3) a youngest recently programmed block stripe. The garbage collection process can use these updated/additional factors to improve the chances of selecting a new candidate block stripe that does not require an L2P table-based search to perform folding. When the selected new candidate block stripe allows the use of a P2L based search, the processing device completes the garbage collection/folding operation in relation to the new candidate block stripe (e.g., in a similar or identical fashion as operation 206) before returning to operation 218 to continue processing the paused L2P candidate block stripe. In some embodiments, operation 222 can operate in a similar or identical fashion as operations 204-226. In particular, the processing device can recursively perform the operations 204-226 for a new candidate block stripe when the new candidate block stripe requires a L2P table-based search. In this fashion, the processing device can fold several block stripes based on P2L table-based searches while still working on completing a garbage collection/folding process in relation to one or more L2P candidate block stripes.

Figure 4:
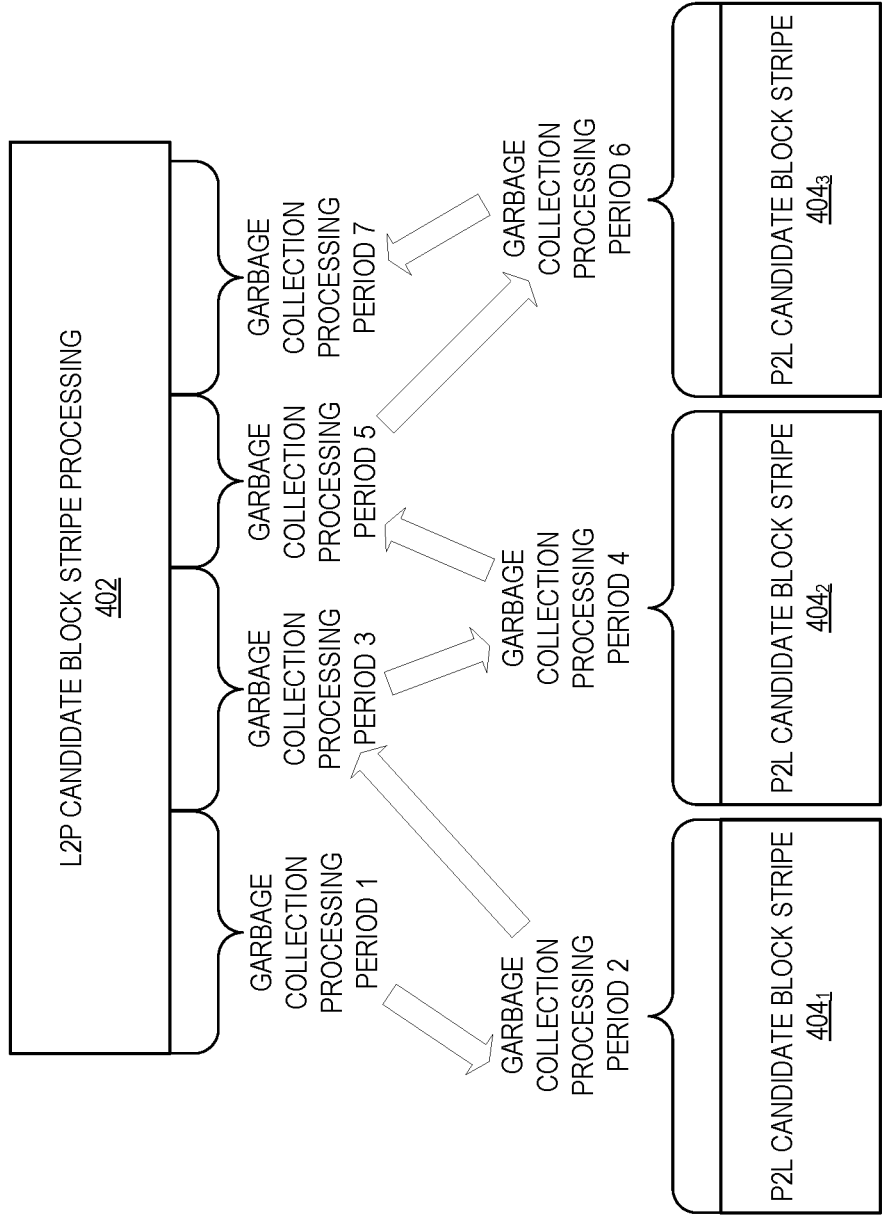
FIG. 4 shows the alternating processing of an L2P candidate block stripe along with several P2L candidate block stripes, in accordance with some embodiments of the present disclosure.

FIG. 4 shows the alternating processing of an L2P candidate block stripe 402 along with several P2L candidate block stripes $404_1$-$404_3$. In particular, the memory subsystem 110 processed the L2P candidate block stripe 402 during a garbage collection time period 1 using an L2P table-based search. However, before the memory subsystem 110 can complete the L2P table-based search, the memory subsystem 110 processes the P2L candidate block stripe $404_1$ during a garbage collection time period 2 using an P2L table-based search. Following completing folding/garbage collection in relation to the P2L candidate block stripe $404_1$, the memory subsystem 110 resumes processing the L2P candidate block stripe 402 during a garbage collection time period 3 using the L2P table-based search. In particular, the memory subsystem 110 resumes the L2P table-based search from a previous location/entry that was saved during the garbage collection time period 1. Before the memory subsystem 110 can complete the L2P table-based search, the memory subsystem 110 processes the P2L candidate block stripe $404_2$ during a garbage collection time period 4 using a P2L table-based search. Following completing garbage collection in relation to the P2L candidate block stripe $404_2$, the memory subsystem 110 resumes processing the L2P candidate block stripe 402 during a garbage collection time period 5 using the L2P table-based search. Again, the memory subsystem 110 resumes the L2P table-based search from a previous location/entry that was saved during the garbage collection time period 3. Before the memory subsystem 110 can complete the L2P table-based search, the memory subsystem 110 processes the P2L candidate block stripe 404₃ during a garbage collection time period 6 using a P2L table-based search. Following completing garbage collection in relation to the P2L candidate block stripe 404₃, the memory subsystem 110 resumes processing the L2P candidate block stripe 402 during a garbage collection time period 7 using the L2P table-based search. Following the garbage collection time period 7, the memory subsystem 110 complete garbage collection in relation to the L2P candidate block stripe 402. Thus, the memory subsystem 110 intermittently processes both an L2P candidate block stripe 402 and several P2L candidate block stripes 404 to avoid deadlocks in performing only L2P table-based garbage collection. Accordingly, as shown and described, the processing device can avoid fatal errors (e.g., severe delays in the memory subsystem 110 caused by L2P table-based searches) while still processing block stripes for which less time-/ resource-intensive search modes (e.g., P2L table-based searches) are not available.

Although adjustment of the write command rate and garbage collection policies are described in a particular order, in some embodiments, the adjustments can be performed in a different order or only one of the adjustments can be performed. For example, in some embodiments, the memory subsystem 110 can only adjust a garbage collection policy in response to a low number of free block stripes or the memory subsystem 110 can adjust a garbage collection policy prior to adjusting a write command speed in response to a low number of free block stripes. Accordingly, adjustment of the write command rate and garbage collection policies are two options that can be used separately or jointly.

Figure 5:
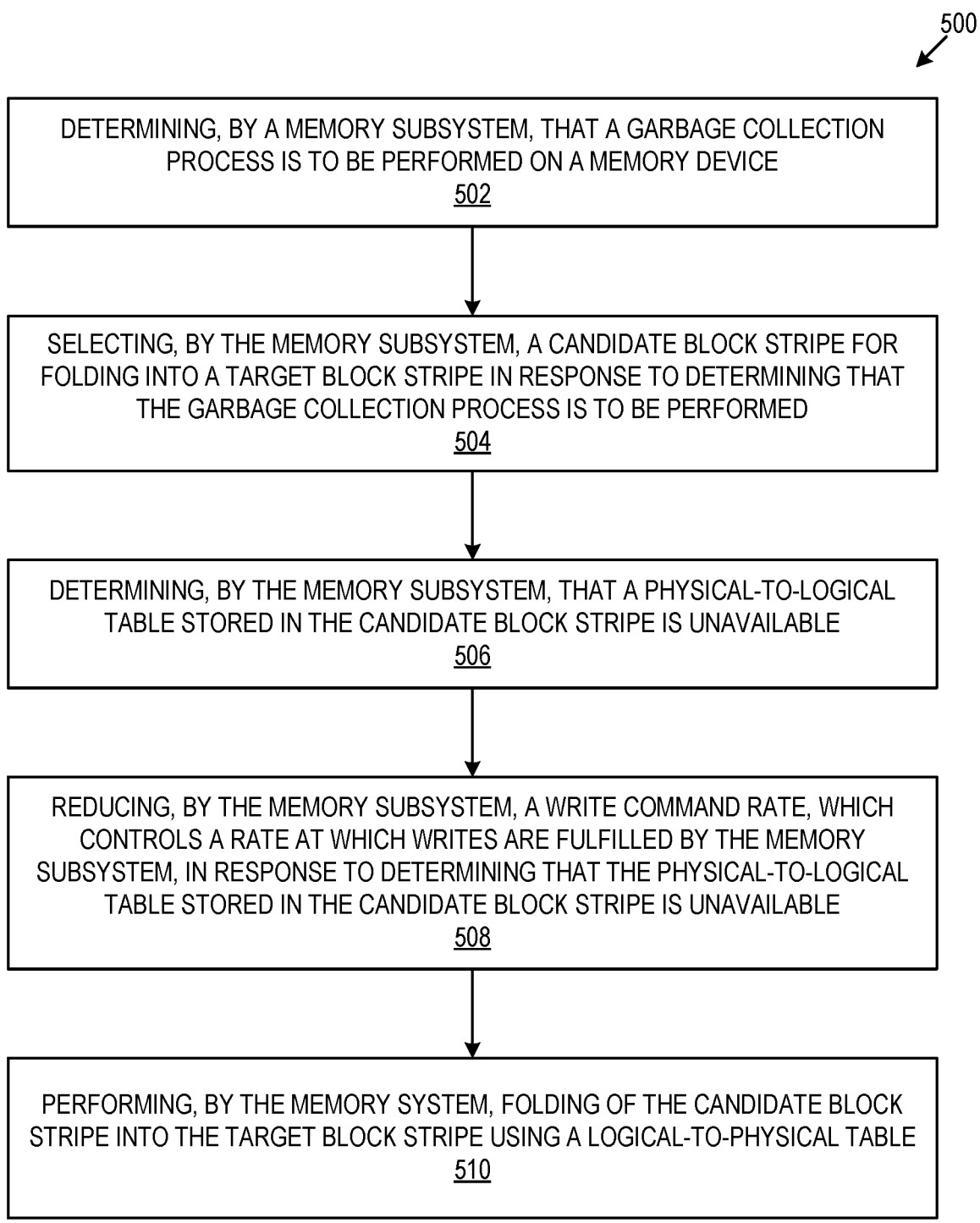
FIG. 5 is a flow diagram of another example method to perform an optimized garbage collection process using either an L2P table and/or a P2L table, in accordance with some embodiments of the present disclosure.

FIG. 5 is a flow diagram of another example method 500 to perform an optimized garbage collection process using either an L2P table and/or a P2L table, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the garbage collection manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 5, the method 500 commences at operation 502 with the processing device determining whether a garbage collection process is to be performed on a memory device 130/140 to free up one or more block stripes in the memory subsystem 110. In one embodiment, the processing device determines whether a garbage collection process is to be performed based on a number of free block stripes (e.g., block stripes that do not have any translation units being used to store data) in the memory subsystem 110 (e.g., in the memory devices 130/140). For example, the processing device can compare the number of free block stripes in the memory devices 130/140 to a garbage collection threshold.

At operation 504, the processing device selects a candidate block stripe for folding into a target block stripe in response to determining that the garbage collection process is to be performed. In particular, the processing device can utilize a garbage collection policy to determine a candidate block stripe for the garbage collection process. Folding the candidate block stripe into the target block stripe includes copying valid pages from the candidate block stripe into pages of the target block stripe.

At operation 506, the processing device determines if a P2L table stored in the candidate block stripe is available. In particular, the memory subsystem 110 can ideally utilize a P2L table for determining valid translation units in the candidate block stripe such that folding/copying can be performed. However, the P2L table may have been corrupted while being stored in the candidate block stripe (e.g., stored along with user data in a TLC block of the memory devices 130/140). Upon determining that the P2L table for the candidate block stripe is corrupt and cannot be used, the processing device determines that the P2L table is unavailable and an L2P search mode is required for performing the garbage collection process in relation to the candidate block stripe.

At operation 508, the processing device reduces a write command rate, which controls the rate at which writes are fulfilled by the memory subsystem 110, in response to determining that the P2L table stored in the candidate block stripe is unavailable. In one embodiment, the processing device can lower a write command rate by delaying completion/fulfillment of a host write request/command by a delay period, which is less than a timeout period of the memory subsystem 110. For example, the processing device can artificially delay fulfillment of a write request from the host system 120 for five seconds (i.e., the delay period is five seconds). This throttling of fulfillment of the write memory request allows for more time for additional block stripes to be freed via the garbage collection process to meet a minimum threshold.

At operation 510, the processing device performs folding of the candidate block stripe into the target block stripe using an L2P table. In particular, each entry in the L2P table includes or otherwise references a physical address, including one or more of a block number/identifier, a page number/identifier, a translation unit number/identifier, and a plane number/identifier. In an L2P table-based search, the block, page, and translation unit numbers of each entry in the L2P table are compared against the block, page, and translation unit numbers of translation units in the candidate block stripe to determine if a match exists. If the block, page, and translation unit numbers of an entry in the L2P table matches with the block, page, and translation unit numbers of a translation unit of the candidate block stripe, this identifies a valid translation unit within the block stripe, which should be folded/copied before the block stripe can be erased. This process is continued until each translation unit is identified as either being valid or invalid, such that valid translation units can be folded/copied into the target block stripe. After folding the valid translation units of the candidate block stripe into the target block stripe, the processing device erases the candidate block stripe to free this block stripe for use in write/rewrite operations.

Figure 6:
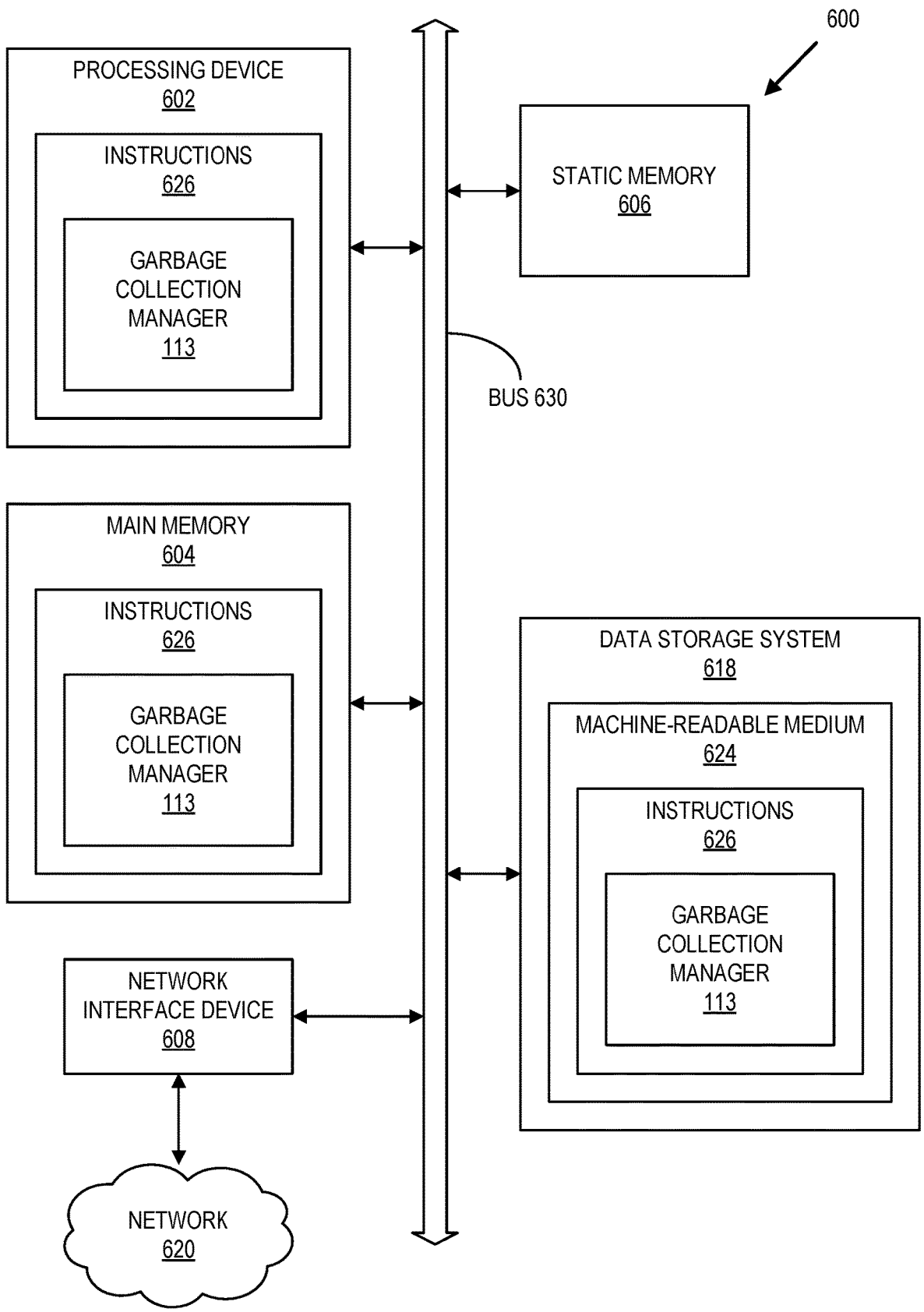
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the garbage collection manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a garbage collection manager (e.g., the garbage collection manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining, by a memory subsystem, that a garbage collection process is to be performed on a memory device;
   selecting, by the memory subsystem, a first candidate block stripe for folding into a first target block stripe, in response to determining that the garbage collection process is to be performed;
   determining, by the memory subsystem, that a physical-to-logical table stored in the first candidate block stripe is unavailable;
   reducing, by the memory subsystem, a write command rate, which controls a rate at which writes are fulfilled by the memory subsystem, in response to determining that the physical-to-logical table stored in the first candidate block stripe is unavailable; and
   performing, by the memory subsystem, folding of the first candidate block stripe into the first target block stripe using a logical-to-physical table.

2. The method of claim 1, wherein determining that the garbage collection process is to be performed on the memory device is based on a number of free block stripes in the memory device failing to meet a garbage collection threshold;
   wherein reducing the write command rate is performed further based on the number of free block stripes in the memory device failing to meet a minimum threshold; and
   wherein the minimum threshold is less than the garbage collection threshold.

3. The method of claim 2, further comprising:
   selecting, by the memory subsystem, a first garbage collection policy for the garbage collection process from a set of garbage collection policies, including the first garbage collection policy and a second garbage collection policy,
   wherein the first garbage collection policy includes a first write delay time for delaying processing of write commands in the memory subsystem.

4. The method of claim 3, wherein the first garbage collection policy is selected for the garbage collection process in response to the number of free block stripes in the memory device failing to meet the minimum threshold.

5. The method of claim 3, further comprising:
   recording, by the memory subsystem in response to selecting the first garbage collection policy, a current location in the logical-to-physical table during performance of folding using the logical-to-physical table; and
   pausing, by the memory subsystem, performance of folding of the first candidate block stripe into the first target block stripe using the logical-to-physical table.

6. The method of claim 5, further comprising:
   selecting, by the memory subsystem in response to selecting the first garbage collection policy, a second candidate block stripe for folding into a second target block stripe;
   performing, by the memory subsystem after pausing performance of folding of the first candidate block stripe, folding of the second candidate block stripe into the second target block stripe using a physical-to-logical table stored in the second candidate block stripe; and
   resuming, by the memory subsystem following completion of folding of the second candidate block stripe into the second target block stripe, performance of folding of the first candidate block stripe into the first target block stripe using the logical-to-physical table.

7. The method of claim 1, wherein folding of the first candidate block stripe into the first target block stripe includes copying valid pages from the first candidate block stripe into pages of the first target block stripe.

8. A non-transitory computer-readable storage medium comprising instructions that, when executed by a processing device, cause the processing device to:
   determine that a garbage collection process is to be performed on a memory device of a memory subsystem;
   select a first candidate block stripe for folding into a first target block stripe, in response to determining that the garbage collection process is to be performed;
   determine that a physical-to-logical table stored in the first candidate block stripe is unavailable;
   reduce a write command rate, which controls a rate at which writes are fulfilled by the memory subsystem, in response to determining that the physical-to-logical table stored in the first candidate block stripe is unavailable; and perform folding of the first candidate block stripe into the first target block stripe using a logical-to-physical table.

9. The non-transitory computer-readable storage medium of claim 8, wherein determining that the garbage collection process is to be performed on the memory device is based on a number of free block stripes in the memory device failing to meet a garbage collection threshold;
   wherein reducing the write command rate is performed further based on the number of free block stripes in the memory device failing to meet a minimum threshold; and
   wherein the minimum threshold is less than the garbage collection threshold.

10. The non-transitory computer-readable storage medium of claim 9, wherein the processing device is further to:
    select a first garbage collection policy for the garbage collection process from a set of garbage collection policies, including the first garbage collection policy and a second garbage collection policy, wherein the first garbage collection policy includes a first write delay time for delaying processing of write commands in the memory subsystem.

11. The non-transitory computer-readable storage medium of claim 10, wherein the first garbage collection policy is selected for the garbage collection process in response to the number of free block stripes in the memory device failing to meet the minimum threshold.

12. The non-transitory computer-readable storage medium of claim 10, wherein the processing device is further to:
record, in response to selecting the first garbage collection policy, a current location in the logical-to-physical table during performance of folding using the logical-to-physical table; and
pause performance of folding of the first candidate block stripe into the first target block stripe using the logical-to-physical table.

13. The non-transitory computer-readable storage medium of claim 12, wherein the processing device is further to:
select, in response to selecting the first garbage collection policy, a second candidate block stripe for folding into a second target block stripe;
perform, after pausing performance of folding of the first candidate block stripe, folding of the second candidate block stripe into the second target block stripe using a physical-to-logical table stored in the second candidate block stripe; and
resume, following completion of folding of the second candidate block stripe into the second target block stripe, performance of folding of the first candidate block stripe into the first target block stripe using the logical-to-physical table.

14. The non-transitory computer-readable storage medium of claim 8, wherein folding of the first candidate block stripe into the first target block stripe includes copying valid pages from the first candidate block stripe into pages of the first target block stripe.

15. A system comprising:
a memory device; and
a processing device, operatively coupled with the memory device, to:
determine that a physical-to-logical table stored in a first candidate block stripe is unavailable, wherein the first candidate block stripe is to be folded into a first target block stripe;
reduce a write command rate, which controls a rate at which writes are fulfilled by the memory subsystem, in response to determining that the physical-to-logical table stored in the first candidate block stripe is unavailable; and
perform folding of the first candidate block stripe into the first target block stripe using a logical-to-physical table.

16. The system of claim 15, wherein reducing the write command rate is performed based on a number of free block stripes in the memory device failing to meet a minimum threshold.

17. The system of claim 16, wherein the processing device is further to:
select a first garbage collection policy for the garbage collection process from a set of garbage collection policies, including the first garbage collection policy and a second garbage collection policy,
wherein the first garbage collection policy includes a first write delay time for delaying processing of write commands in the memory subsystem.

18. The system of claim 17, wherein the first garbage collection policy is selected for the garbage collection process in response to the number of free block stripes in the memory device failing to meet the minimum threshold.

19. The system of claim 17, wherein the processing device is further to:
record, in response to selecting the first garbage collection policy, a current location in the logical-to-physical table during performance of folding using the logical-to-physical table;
pause performance of folding of the first candidate block stripe into the first target block stripe using the logical-to-physical table;
select, in response to selecting the first garbage collection policy, a second candidate block stripe for folding into a second target block stripe;
perform, after pausing performance of folding of the first candidate block stripe, folding of the second candidate block stripe into the second target block stripe using a physical-to-logical table stored in the second candidate block stripe; and
resume, following completion of folding of the second candidate block stripe into the second target block stripe, performance of folding of the first candidate block stripe into the first target block stripe using the logical-to-physical table.

20. The system of claim 15, wherein folding of the first candidate block stripe into the first target block stripe includes copying valid pages from the first candidate block stripe into pages of the first target block stripe.

* * * * *